United States Patent
Nishino et al.

(10) Patent No.: US 11,512,983 B2
(45) Date of Patent: Nov. 29, 2022

(54) ENCODER AND ENCODER CONTROL METHOD

(71) Applicant: FANUC CORPORATION, Yamanashi (JP)

(72) Inventors: Shouhei Nishino, Yamanashi-ken (JP); Youhei Kondou, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 17/019,873

(22) Filed: Sep. 14, 2020

(65) Prior Publication Data

US 2021/0080292 A1 Mar. 18, 2021

(30) Foreign Application Priority Data

Sep. 17, 2019 (JP) .............................. JP2019-168180

(51) Int. Cl.
*G01D 5/243* (2006.01)

(52) U.S. Cl.
CPC .................................. *G01D 5/243* (2013.01)

(58) Field of Classification Search
CPC ...... G01D 5/243; G01D 5/24476; G01D 5/00; G05D 19/02
See application file for complete search history.

(56) References Cited

U.S. PATENT DOCUMENTS

2008/0035837 A1* 2/2008 Hane ..................... G01D 5/366
250/237 G

FOREIGN PATENT DOCUMENTS

| JP | 2003-083771 A | 3/2003 |
| JP | 2009-139099 A | 6/2009 |
| JP | 2011-075404 A | 4/2011 |
| WO | WO-2018/079014 A1 | 5/2018 |

* cited by examiner

*Primary Examiner* — Farhana A Hoque
(74) *Attorney, Agent, or Firm* — Robert P. Michal, Esq.; Carter, DeLuca & Farrell LLP

(57) ABSTRACT

An encoder includes: a phase signal generator that generates and outputs first and second sinusoidal analog signals that are out of phase with each other by 90 degrees, according to a movement of a measurement target; a Lissajous angle calculator that determines a Lissajous angle from the first and second analog signals; and an amplitude adjustor that adjusts an amplitude of only the first analog signal output from the phase signal generator and outputs the adjusted amplitude to the Lissajous angle calculator.

6 Claims, 5 Drawing Sheets

ENCODER AND ENCODER CONTROL METHOD

CROSS-REFERENCE TO RELATED APPLICATION

This application is based upon and claims the benefit of priority from Japanese Patent Application No. 2019-168180 filed on Sep. 17, 2019, the contents of which are incorporated herein by reference.

BACKGROUND OF THE INVENTION

Field of the Invention

The present invention relates to an encoder that determines a Lissajous angle and a method of controlling the encoder.

Description of the Related Art

There are encoders that calculate and output the moving distance of a measurement target based on two sinusoidal wave signals that are out of phase with each other by 90 degrees and supplied from a sensor. However, because each of the sinusoidal wave signals that are 90° out of phase with each other contain errors, in order to adjust the amplitudes of the two signals and determine a Lissajous angle, Japanese Laid-Open Patent Publication No. 2011-075404 discloses a configuration in which errors of the signals that are 90° out of phase with each other are corrected individually.

SUMMARY OF THE INVENTION

However, when the errors of both signals that are 90° out of phase with each other are corrected as in Japanese Laid-Open Patent Publication No. 2011-075404, there is a problem that a circuit scale and workloads increase.

It is therefore an object of the present invention to provide an encoder and an encoder control method capable of determining an accurate Lissajous angle with a simple configuration.

A first aspect of the present invention is an encoder, which includes: a phase signal generator configured to generate and output first and second sinusoidal analog signals that are out of phase with each other by 90 degrees, according to a movement of a measurement target; a Lissajous angle calculator configured to determine a Lissajous angle from the first and second analog signals; and an amplitude adjustor configured to adjust an amplitude of only the first analog signal output from the phase signal generator and to output the adjusted amplitude to the Lissajous angle calculator.

A second aspect of the present invention is a method, which includes: a phase signal generating step of generating and outputting first and second sinusoidal analog signals that are out of phase with each other by 90 degrees, according to a movement of a measurement target; a Lissajous angle calculating step of determining a Lissajous angle from the first and second analog signals; and an amplitude adjusting step of adjusting an amplitude of only the first analog signal output at the phase signal generating step and outputting the adjusted amplitude to the Lissajous angle calculating step.

According to the present invention, an accurate Lissajous angle can be determined with a simple configuration.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An encoder and an encoder control method according to the present invention will be detailed below by describing preferred embodiment with reference to the accompanying drawings.

Embodiment

Figure 1:
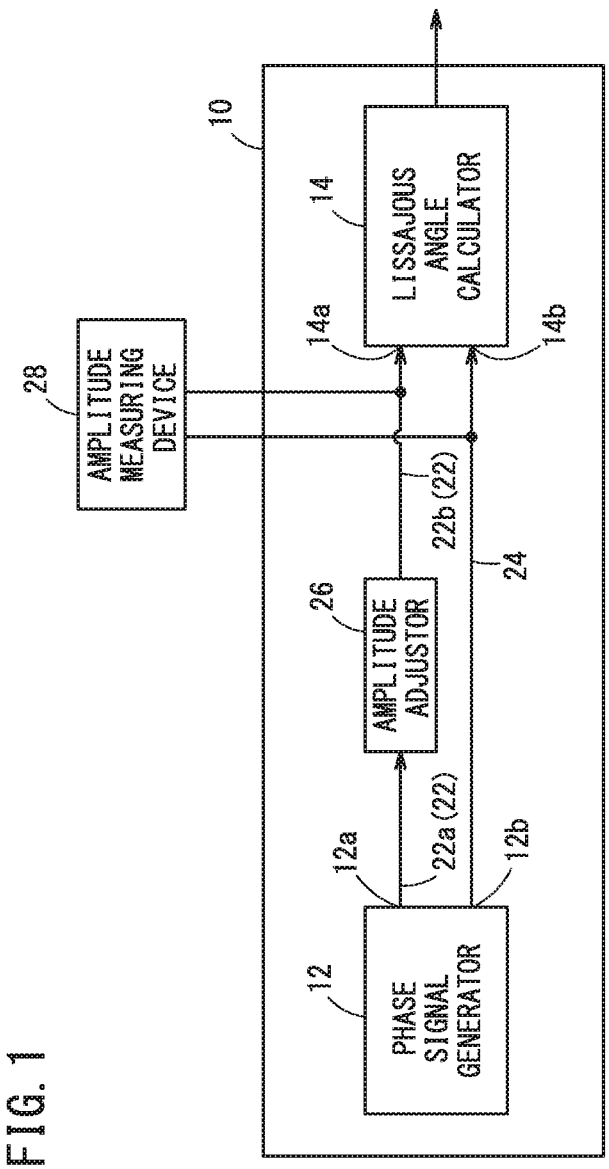
FIG. 1 is a configuration diagram of an encoder according to an embodiment.

FIG. 1 is a configuration diagram of an encoder 10 according to an embodiment.

The encoder 10 includes a phase signal generator 12 and a Lissajous angle calculator 14.

The phase signal generator 12 has a sensor that senses a movement of a measurement target (not shown) such as a motor, and generates analog signals according to positions (for example, rotational positions) of the measurement target. The phase signal generator 12 generates analog signals of sinusoidal waves having phases different from each other by 90 degrees—namely an A-phase signal that is a first analog signal and a B-phase signal that is a second analog signal—according to the movement of the measurement target. Then, the phase signal generator 12 outputs the A-phase signal from an output terminal 12a and outputs the B-phase signal from an output terminal 12b.

The Lissajous angle calculator 14 includes an input terminal 14a for receiving the A-phase signal and an input terminal 14b for receiving the B-phase signal. The Lissajous angle calculator 14 determines a Lissajous angle from the received A-phase signal and B-phase signal. Then, the Lissajous angle calculator 14 outputs a signal indicating the position of the measurement target based on the Lissajous angle determined from the A-phase signal and the B-phase signal.

Figure 2:
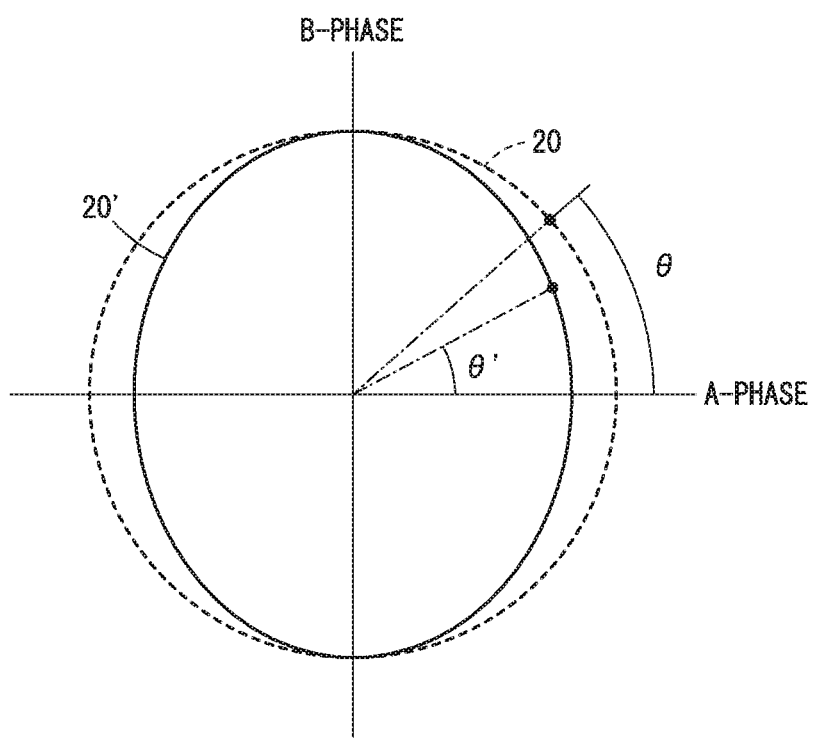
FIG. 2 is a diagram showing a Lissajous waveform.

FIG. 2 is a diagram showing a Lissajous waveform 20. The horizontal axis in FIG. 2 represents the value of the A-phase signal, and the vertical axis represents the value of the B-phase signal. The angle formed between the straight line that extends from the coordinate origin of FIG. 2 to a point on the Lissajous waveform 20 (broken line) and the positive direction of the horizontal axis is a Lissajous angle $\theta$. When the amplitudes of the A-phase signal and the B-phase signal are equal, a Lissajous waveform forms a circle as the Lissajous waveform 20, whereby a correct Lissajous angle $\theta$ can be obtained. However, when the amplitudes of the A-phase signal and the B-phase signal become different due to some kind of errors added to the signals, a Lissajous waveform forms an ellipse as the Lissajous waveform 20' (solid line). As a result, the Lissajous angle $\theta'$ obtained from the Lissajous waveform 20' will contain an error. The Lissajous waveform 20' shows an example in which the amplitude of the A-phase signal is smaller than that of the B-phase signal.

Figure 3:
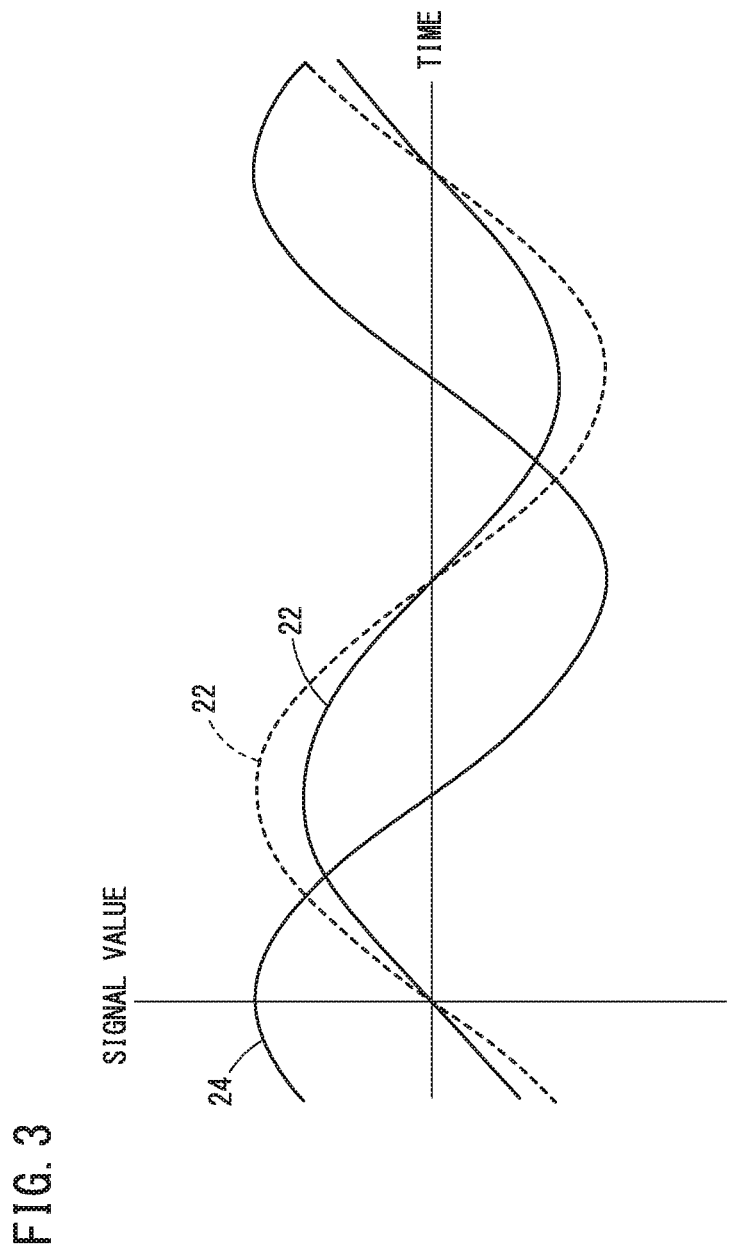
FIG. 3 is a diagram showing an A-phase signal and a B-phase signal.

FIG. 3 is a diagram showing the A-phase signal 22 and the B-phase signal 24. The vertical axis represents a signal value, and the horizontal axis represents time. The A-phase signal 22 shown by a solid line and the B-phase signal 24 shown by a solid line correspond to the Lissajous waveform 20' in FIG. 2. The amplitude of the solid A-phase signal 22 is smaller than the amplitude of the solid B-phase signal 24. Therefore, the Lissajous waveform 20' of FIG. 2 is an ellipse with the minor axis lying along the horizontal axis and the major axis lying along the vertical axis. Here, in FIG. 3, when the A-phase signal 22 indicated by the solid line is adjusted to have the same amplitude as the B-phase signal 24, the A-phase signal 22 indicated by a broken line is obtained. The A-phase signal 22 indicated by the broken line and the B-phase signal 24 form the Lissajous waveform 20 of FIG. 2.

In order to correct deviations of the Lissajous angle caused by the errors involved in the A-phase signal 22 and the B-phase signal 24 as described above, the encoder 10 includes an amplitude adjustor 26 provided between the output terminal 12a of the phase signal generator 12 and the input terminal 14a of the Lissajous angle calculator 14. The amplitude adjustor 26 adjusts the amplitude of only the input A-phase signal 22a (22) and outputs an adjusted A-phase signal 22b (22) to the Lissajous angle calculator 14. Specifically, the amplitude adjustor 26 is made up of a variable resistor and so on, which allows the operator to change the resistance and adjust the amplitude of the A-phase signal 22b.

In addition, an amplitude measuring device 28 is provided outside the encoder 10. The amplitude measuring device 28 measures the amplitude of the A-phase signal 22b output from the amplitude adjustor 26 and the amplitude of the B-phase signal 24 output from the output terminal 12b of the phase signal generator 12. The amplitude measuring device 28 includes a display unit (not shown) to display the amplitude value of the A-phase signal 22b and the amplitude value of the B-phase signal 24 for the operator. The operator can adjust the amplitude of the A-phase signal 22b so as to equalize the amplitudes of the A-phase signal 22b and the B-phase signal 24 by operating the amplitude adjustor 26 while watching the display on the display unit of the amplitude measuring device 28. Although the amplitude measuring device 28 is provided outside the encoder 10 in FIG. 1, the amplitude measuring device 28 may be provided inside the encoder 10. In this case, the amplitude measuring device 28 may not include the display unit, and instead the display unit may be provided outside the encoder 10.

Thus, the A-phase signal 22 of the solid line in FIG. 3 is adjusted to the A-phase signal 22 of the broken line, whereby the shape of the Lissajous waveform is adjusted to a circle like the Lissajous waveform 20. As a result, the accurate Lissajous angle θ can be obtained and the Lissajous angle calculator 14 can accurately output the signal indicating the position of the measurement target.

In the prior art, in order to determine an accurate Lissajous angle from analog signals that are 90° out of phase with each other, hardware such as a circuit that individually correct signals of two phases was required. However, according to the encoder 10 of the embodiment, it is possible to determine an accurate Lissajous angle only with the hardware that adjusts the amplitude of one analog signal. Therefore, according to the encoder 10 of the embodiment, it is possible to determine an accurate Lissajous angle with a simpler structure than the conventional one.

Figure 4:
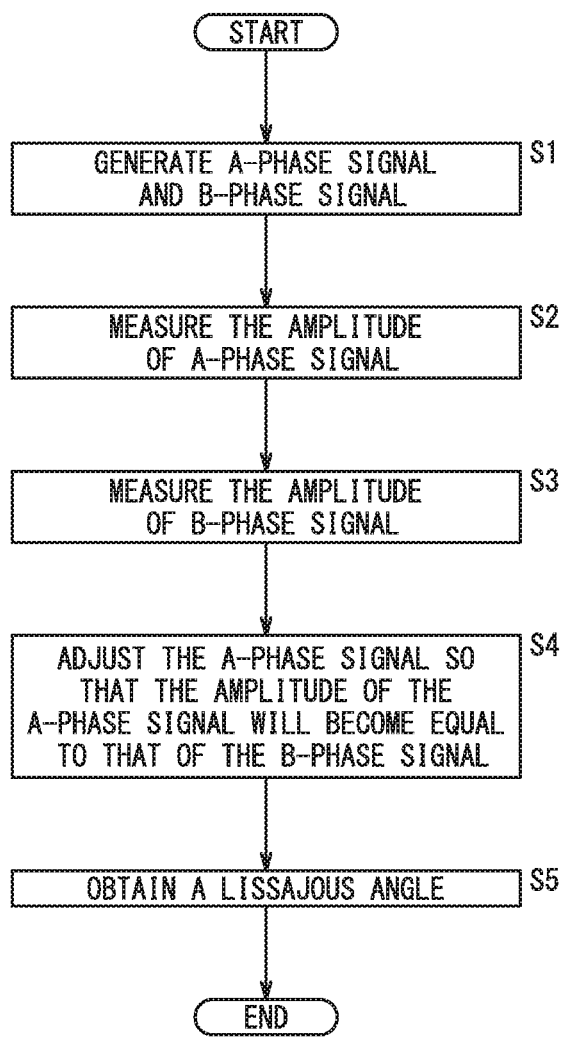
FIG. 4 is a flowchart for explaining an encoder control method according to an embodiment.

FIG. 4 is a flowchart for explaining the control method of the encoder 10 in the embodiment.

First, the phase signal generator 12 generates and outputs, according to the movement of the measurement target, the sinusoidal A-phase signal 22 and B-phase signal 24 that are 90° out of phase with each other (step S1).

Next, the amplitude measuring device 28 measures the amplitude of the A-phase signal 22b output from the amplitude adjustor 26 (step S2).

Further, the amplitude measuring device 28 measures the amplitude of the B-phase signal 24 output from the output terminal 12b of the phase signal generator 12 (step S3).

Then, the operator operates the amplitude adjustor 26 while watching the display on the display unit of the amplitude measuring device 28 to adjust the amplitude of only the A-phase signal 22b so that the amplitude of the A-phase signal 22b becomes equal to the amplitude of the B-phase signal 24 (step S4).

Finally, the Lissajous angle calculator 14 determines the Lissajous angle θ from the A-phase signal 22b and the B-phase signal 24 adjusted and output by the amplitude adjustor 26 at step S4 (step S5).

In the description of the above embodiment, the amplitude adjustor 26 is configured to be able to adjust the amplitude of the A-phase signal 22. However, the amplitude adjustor 26 may be disposed between the output terminal 12b of the phase signal generator 12 and the input terminal 14b of the Lissajous angle calculator 14 and adjust only the amplitude of the B-phase signal 24.

MODIFICATIONS

The above embodiment may be modified as follows.

Modification 1

Figure 5:
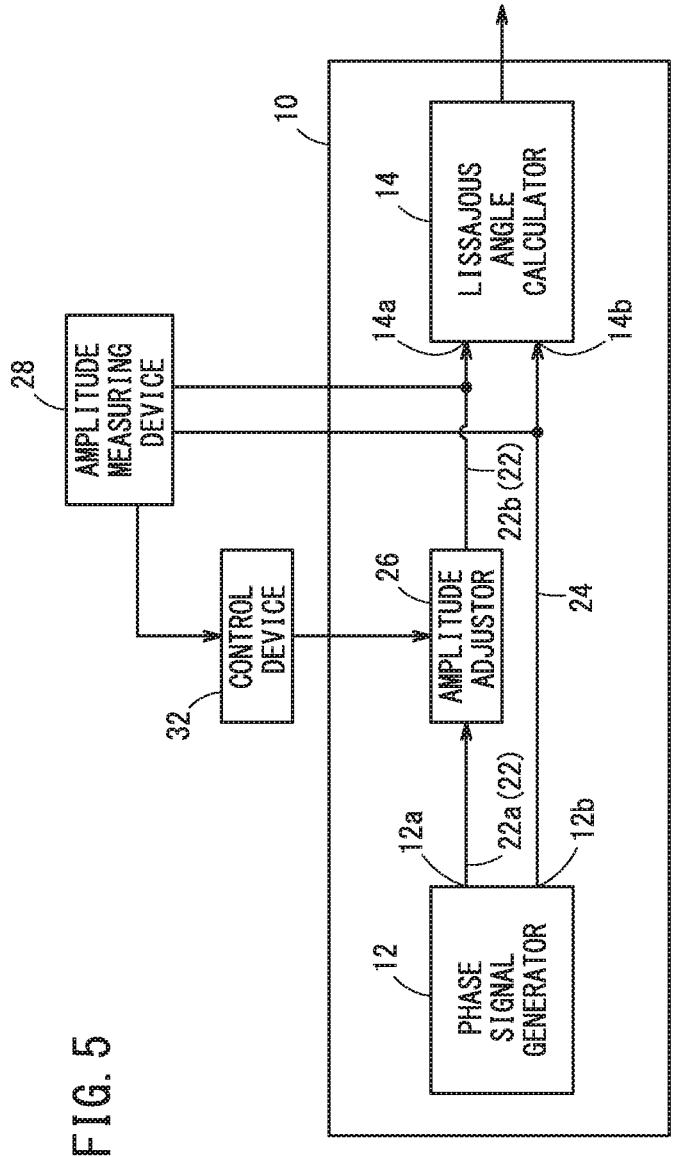
FIG. 5 is a configuration diagram of an encoder in a modification 1.

FIG. 5 is a configuration diagram of an encoder 10 according to a modification 1. In the above embodiment, the A-phase signal 22b is adjusted by the operator so that the amplitude of the A-phase signal 22b will become equal to the amplitude of the B-phase signal 24. The encoder 10 of the modification 1 automatically performs the adjustment. For this purpose, in FIG. 5, a control device 32 is provided outside of the encoder 10 of FIG. 1.

The amplitudes of the A-phase signal 22b and the B-phase signal 24 measured by the amplitude measuring device 28 are input to the control device 32. The control device 32 includes an actuator (not shown), and mechanically controls a variable resistor and so on of the amplitude adjustor 26 to automatically adjust the amplitude of the A-phase signal 22 so that the amplitude of the A-phase signal 22b will become equal to the amplitude of the B-phase signal 24. That is, the processing flow of the control method of the encoder 10 in the modification is the same as that of the above embodiment except that step S4 in FIG. 4 is performed by the control device 32 instead of the operator. Thus, the amplitude of the A-phase signal 22b can be automatically adjusted so as to be equal to the amplitude of the B-phase signal 24. As a result, the workload of the operator can be eliminated.

Although the amplitude measuring device 28 and the control device 32 are provided outside the encoder 10 in FIG. 5, both the amplitude measuring device 28 and the control device 32 may be provided inside the encoder 10.

Invention Obtained from Embodiment

The invention that can be understood from the above-described embodiment and modification are described below.

First Aspect of Invention

An encoder (10) includes: a phase signal generator (12) configured to generate and output first and second sinusoidal analog signals that are out of phase with each other by 90 degrees, according to the movement of a measurement target; a Lissajous angle calculator (14) configured to determine a Lissajous angle from the first and second analog signals; and an amplitude adjustor (26) configured to adjust the amplitude of only the first analog signal output from the phase signal generator (12) and to output the adjusted amplitude to the Lissajous angle calculator (14).

Thereby, it is possible to determine a Lissajous angle with a simpler configuration compared to the conventional configuration.

The amplitude adjustor (26) may be configured to automatically adjust and output the first analog signal so that the amplitude of the first analog signal becomes equal to the amplitude of the second analog signal. This makes it possible to eliminate the workload of the operator.

Second Aspect of Invention

A control method of an encoder (10) includes: a phase signal generating step of generating and outputting first and second sinusoidal analog signals that are out of phase with each other by 90 degrees, according to the movement of a measurement target; a Lissajous angle calculating step of determining a Lissajous angle from the first and second analog signals; and an amplitude adjusting step of adjusting the amplitude of only the first analog signal output at the phase signal generating step and outputting the adjusted amplitude to the Lissajous angle calculating step.

Thereby, it is possible to determine a Lissajous angle with a simpler configuration compared to the conventional configuration.

The amplitude adjusting step may automatically adjust and output the first analog signal so that the amplitude of the first analog signal becomes equal to the amplitude of the second analog signal. This makes it possible to eliminate the workload of the operator.

The control method of an encoder (10) may further include: a step of measuring the amplitude of the first analog signal; and a step of measuring the amplitude of the second analog signal.

The present invention is not limited to the above-described embodiment, and various modifications can be made without departing from the gist of the present invention.

What is claimed is:

1. An encoder, comprising:
   a phase signal generator configured to generate and output first and second sinusoidal analog signals that are out of phase with each other by 90 degrees, according to a movement of a measurement target;
   a Lissajous angle calculator configured to determine a Lissajous angle from the first and second analog signals; and
   an amplitude adjustor configured to adjust an amplitude of only the first analog signal output from the phase signal generator and to output the adjusted amplitude to the Lissajous angle calculator.

2. The encoder according to claim 1, wherein the amplitude adjustor is configured to automatically adjust and output the first analog signal so that the amplitude of the first analog signal becomes equal to an amplitude of the second analog signal.

3. A control method of an encoder, comprising:
   a phase signal generating step of generating and outputting first and second sinusoidal analog signals that are out of phase with each other by 90 degrees, according to a movement of a measurement target;
   a Lissajous angle calculating step of determining a Lissajous angle from the first and second analog signals; and
   an amplitude adjusting step of adjusting an amplitude of only the first analog signal output at the phase signal generating step and outputting the adjusted amplitude to the Lissajous angle calculating step.

4. The control method of an encoder according to claim 3, wherein the amplitude adjusting step automatically adjusts and outputs the first analog signal so that the amplitude of the first analog signal becomes equal to an amplitude of the second analog signal.

5. The control method of an encoder according to claim 3, further comprising:
   a step of measuring the amplitude of the first analog signal; and
   a step of measuring the amplitude of the second analog signal.

6. The control method of an encoder according to claim 4, further comprising:
   a step of measuring the amplitude of the first analog signal; and
   a step of measuring the amplitude of the second analog signal.

* * * * *